US012564946B2

(12) United States Patent
Guo et al.

(10) Patent No.: US 12,564,946 B2
(45) Date of Patent: Mar. 3, 2026

(54) DEVICE AND METHOD FOR CONTROLLING A ROBOT DEVICE

(71) Applicant: Robert Bosch GmbH, Stuttgart (DE)

(72) Inventors: Meng Guo, Beijing (CN); Mathias Buerger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 220 days.

(21) Appl. No.: 18/047,358

(22) Filed: Oct. 18, 2022

(65) Prior Publication Data

US 2023/0141855 A1    May 11, 2023

(30) Foreign Application Priority Data

Nov. 5, 2021    (DE) ...................... 10 2021 212 494.1

(51) Int. Cl.
B25J 9/16 (2006.01)
(52) U.S. Cl.
CPC ............. B25J 9/163 (2013.01); B25J 9/1679 (2013.01)
(58) Field of Classification Search
CPC ........ B25J 9/163; B25J 9/1679; B25J 9/1661; B25J 13/00; B25J 9/1602; B25J 9/161; B25J 9/1628; B25J 9/1653; B25J 9/1656; B25J 9/1664; G06N 3/08; G06N 3/092; G05B 19/0426; G05B 2219/13065; G05B 2219/23078; G05B 2219/23167; G05B 2219/33056; G05B 2219/34254
See application file for complete search history.

(56) References Cited

U.S. PATENT DOCUMENTS

| | | | | |
|---|---|---|---|---|
| 9,802,317 B1* | 10/2017 | Watts | ................... | G05B 19/402 |
| 2021/0252698 A1* | 8/2021 | Paxton | ................... | G06N 3/045 |
| 2021/0362330 A1* | 11/2021 | Kolluri | ............... | G05B 19/423 |
| 2022/0371203 A1* | 11/2022 | Fujita | ....................... | B25J 13/06 |
| 2023/0083349 A1* | 3/2023 | Kranski | ................. | G06N 3/008 |
| | | | | 706/14 |
| 2024/0009851 A1* | 1/2024 | Mousavian | ............ | B25J 9/1697 |
| 2024/0131712 A1* | 4/2024 | Gruenstein | ............ | B25J 9/1664 |
| 2024/0149446 A1* | 5/2024 | Tomiie | ................... | B25J 9/1602 |

(Continued)

FOREIGN PATENT DOCUMENTS

| | | |
|---|---|---|
| DE | 102011109114 A1 | 2/2013 |
| DE | 102012213188 A1 | 2/2013 |
| DE | 102013202378 B4 | 7/2015 |

(Continued)

*Primary Examiner* — Esvinder Singh
(74) *Attorney, Agent, or Firm* — NORTON ROSE FULBRIGHT US LLP

(57)    ABSTRACT

A method for controlling a robot device. The method includes providing a selection model and executing multiple instances of a task, including, in each execution, when a function of the robot device needs to be selected to perform the task instance, checking whether the selection model provides a selection of a function and, if yes, controlling the robot device to perform the function selected by the selection model and if no, receiving user input indicating a selection of a function, selecting a function according to the selection indicated by the user input, controlling the robot device to perform the function selected according to the selection indicated by the user input and training the selection model according to the selection indicated by the user input.

9 Claims, 4 Drawing Sheets

(56)         References Cited

U.S. PATENT DOCUMENTS

2024/0261968 A1 *  8/2024  Wang ..................... B25J 9/1666

FOREIGN PATENT DOCUMENTS

| | | | |
|---|---|---|---|
| DE | 202017105598 | U1 | 5/2018 |
| DE | 112018002565 | T5 | 3/2020 |
| DE | 112020000009 | T5 | 10/2020 |
| DE | 102021103272 | A1 | 8/2021 |
| DE | 102020204551 | A1 | 10/2021 |
| DE | 102020207085 | A1 | 12/2021 |
| EP | 3771522 | A1 | 2/2021 |

* cited by examiner

400

DEVICE AND METHOD FOR CONTROLLING A ROBOT DEVICE

CROSS REFERENCE

The present application claims the benefit under 35 U.S.C. § 119 of German Patent Application No. DE 10 2021 212 494.1 filed on Nov. 5, 2021, which is expressly incorporated herein by reference in its entirety.

FIELD

The present disclosure relates to devices and methods for controlling a robot device.

BACKGROUND INFORMATION

Robotic skills may be programmed through learning-from-demonstration (LfD) approaches, where a nominal plan of a skill is learned by a robot from demonstrations. The main idea of LfD is to parameterize Gaussians by the pose of a camera monitoring the robot's workspace and a target object to be handled by the robot. Learning from demonstration provides a fast, intuitive and efficient framework to program robot skills, e.g. for industrial applications. However, instead of a single motion, complex manipulation tasks often contain multiple branches of skill sequences that share some common skills. A planning process is therefore needed which generates the right sequence of skills and their parameters under different scenarios. For instance, a bin-picking task involves to pick an object from the box (depending on how where it is located in the box), clear it from the corners if needed, re-orient it to reveal its barcode, and show the barcode to a scanner. Choosing the correct skill sequence is essential for flexible robotic systems across various applications. Such transitions among the skills and the associated conditions are often difficult and tedious to specify manually.

Therefore, reliable approaches for selecting the correct sequence of skill primitives and the correct parameters for each skill primitive under various scenarios are desirable.

SUMMARY

According to various embodiments of the present invention, a method for controlling a robot device is provided comprising providing, for each function of a plurality of functions, a control model for controlling the robot device to perform the function, providing a selection model for selecting among the plurality of functions and executing multiple instances of a task by the robot device, comprising, in each execution, when a function of the plurality of functions needs to be selected to perform the task instance, checking whether the selection model provides a selection of a function and, if the selection model provides a selection of a function, controlling the robot device to perform the function selected by the selection model using the control model for the selected function and if the selection model does not provide a selection of a function, receiving user input indicating a selection of a function, selecting a function according to the selection indicated by the user input, controlling the robot device to perform the function selected according to the selection indicated by the user input using the control model for the selected function and training the selection model according to the selection indicated by the user input.

Thus, the method described above allows training a selection model on the fly during control of a robot device by user (i.e. human) input. The provided selection model may be untrained or only pre-trained, such that, at least for some configurations of the robot device (or the controlled system, e.g. including configurations of the environment such as objects), the selection model does not provide a selection of a function. During execution of task instances the selection model gets more and more reliable such that in the end, the robot device can perform complex manipulation tasks comprising sequences of multiple skills and/or skill branches.

In the following, various examples are given.

Example 1 is a method for controlling a robot as described above.

Example 2 is the method of Example 1, wherein the selection model outputs indications of confidences for selections of functions of the plurality of functions and wherein training the selection model according to the selection indicated by the user input comprises adjusting the selection model to increase a confidence output by the selection model to select the function selected according to the selection indicated by the user input.

Thus, the robot device gets more and more confident for selections for which it has received user input until it can behave autonomously.

Example 3 is the method of Example 1 or 2, wherein the selection model outputs indications of confidences for selections of functions of the plurality of functions and checking whether the selection model provides a selection of a function comprises checking whether the selection model outputs an indication of a confidence for a selection of the function which is above a predetermined lower confidence bound.

The selection model is thus trained such that it gets more and more certain about the selection of functions until it has achieved a sufficient confidence for certain selections (e.g. for skill branch selections in certain states). Then, user input is no longer necessary (and e.g. no longer requested). Thus, the effort for the user diminishes over time and the robot device can eventually perform the task autonomously.

On the other hand, in situations that have not yet been encountered (and thus, confidence is low), user input is used as a basis for the selection. Thus, wrong decisions which might, for example, lead to damages to the robot device or handled objects, can be avoided.

Example 4 is the method of any one of Examples 1 to 3, wherein the functions include skill and branches of skills and the selection function is trained to provide, for sets of alternative skills, a selection of a skill and, for sets of alternative branches of skills, a selection of a branch.

Thus, a hierarchical approach is used wherein selections of skills are performed and, for a selected skill, a selection of a branch. The selection model may thus include an edge selector (to select among skills, e.g. in a task network) and a branch selector (to select among branches of skills). This makes the selection more understandable and thus intuitive for the human user, reducing user effort and errors in the selection.

Example 5 is the method of any one of Examples 1 to 4, wherein providing the control model for each function comprises performing demonstrations of the function and training the control model using the demonstrations.

In other words, the functions (e.g. primitive skills) are trained from learning by demonstrations. This provides an efficient way to learn primitive skills.

Example 6 is the method of any one of Examples 1 to 5, wherein the selection model is a logistic regression model.

This allows reliable fast training (and re-training) from low amounts of data

Example 7 is the method of any one of Examples 1 to 6, comprising, if the selection model does not provide a selection of a function, pausing operation of the robot device until user input indicating a selection of a function has been received.

The robot device thus operates until its controller can no longer decide with which function to proceed and then pauses until the user guides it. Thus, wrong operation which may lead to damages can be avoided. Moreover, the robot device pausing indicates to the user that user input is needed.

Example 8 is a robot controller, configured to perform a method of any one of Examples 1 to 7.

Example 9 is a computer program comprising instructions which, when executed by a computer, makes the computer perform a method according to any one of Examples 1 to 7.

Example 10 is a computer-readable medium comprising instructions which, when executed by a computer, makes the computer perform a method according to any one of Examples 1 to 7.

In the figures, similar reference characters generally refer to the same parts throughout the different views. The figures are not necessarily to scale, emphasis instead generally being placed upon illustrating the principles of the present invention. In the following description, various aspects are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
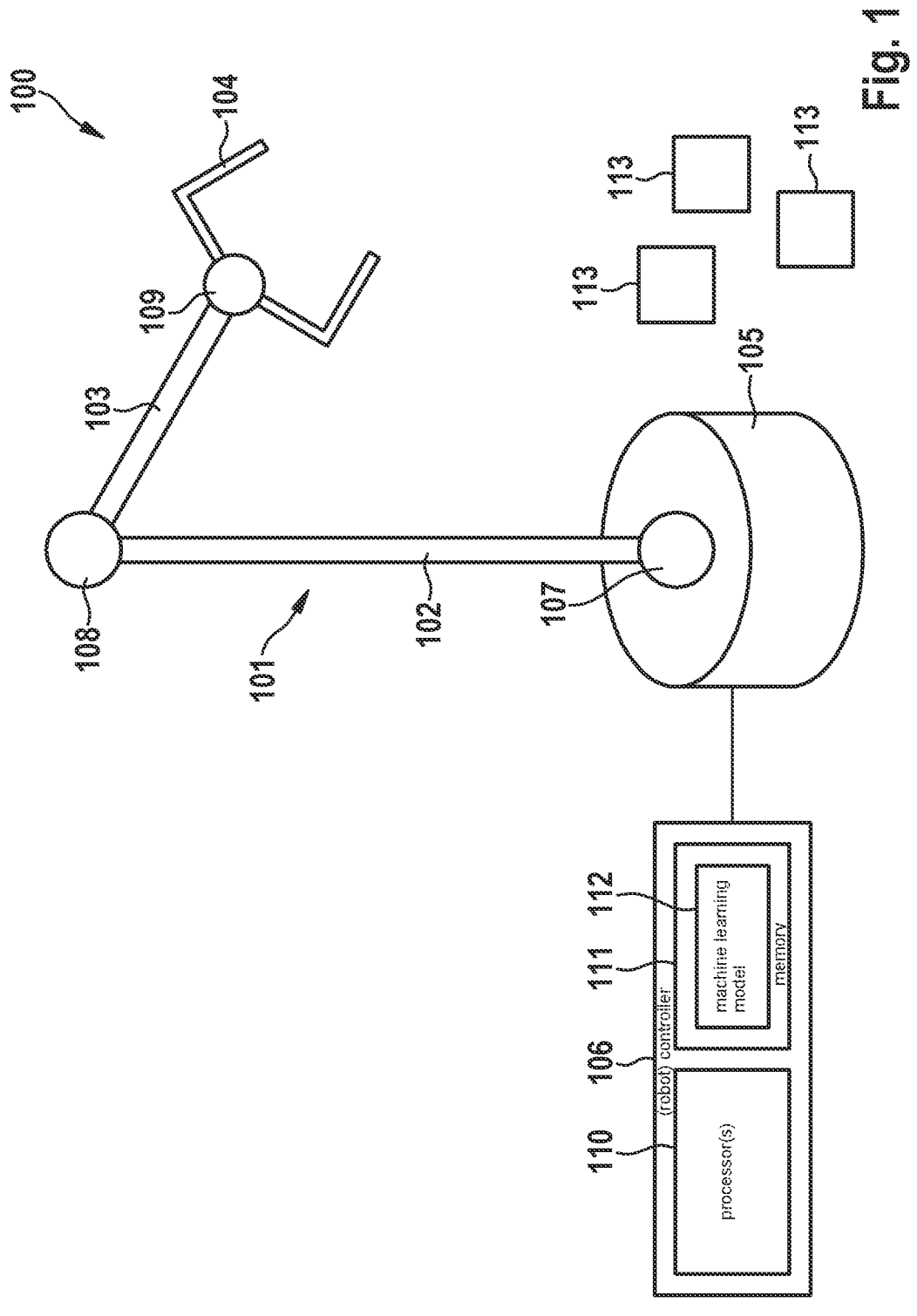
FIG. 1 shows a robot according to an example embodiment of the present invention.

FIG. 1 shows a robot 100.

The robot 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm (possibly with a tool at its end).

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e. rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot arm 101. According to various embodiments, the controller 106 controls the robot arm 101 on the basis of a machine learning model 112 stored in the memory 111. The machine learning model 112 includes control models for skills and skill branches as well as a selection model to select among skills and skill branches.

A robot 100 can take advantage of learning-from-demonstration (LED) approaches to learn to execute a skill or collaborate with a human partner. Human demonstrations can be encoded by a probabilistic model (also referred to as control model). The controller 106 can subsequently use the control model, which is also referred to as robot trajectory model, to generate the desired robot movements, possibly as a function of the state (configuration) of both the human partner, the robot and the robot's environment.

The basic idea of LfD is to fit a prescribed skill model such as GMMs to a handful of demonstrations. Let there be M demonstrations, each of which contains $T_m$ data points for a dataset of $N=\Sigma_m T_m$ total observations $\xi=\{\xi_t\}_{t=1}^{N}$, where $\xi_t \in \mathbb{R}^d$. Also, it is assumed that the same demonstrations are recorded from the perspective of P different coordinate systems (given by the task parameters such as local coordinate systems or frames of objects of interest). One common way to obtain such data is to transform the demonstrations from a static global frame to frame p by $\xi_t^{(p)} = A^{(p)^{-1}}(\xi_t - b^{(p)})$. Here, $\{(b^{(p)}, A^{(p)})\}_{p=1}^{P}$ is the translation and rotation of (local) frame p w.r.t. the world (i.e. global) frame.

Then, a TP-GMM is described by the model parameters $\{\pi_k, \{\mu_k^{(p)}, \Sigma_k^{(p)})\}_{p=1}^P\}_{k=1}^K$ where K represents the number of Gaussian components in the mixture model, $\pi_k$ is the prior probability of each component, and $\{\mu_k^{(p)}, \Sigma_k^{(p)}\}_{p=1}^P$ are the parameters (mean and covariance) of the k-th Gaussian component within frame p.

Differently from standard GMM, the mixture model above cannot be learned independently for each frame. Indeed, the mixing coefficients $\pi_k$ are shared by all frames and the k-th component in frame p must map to the corresponding k-th component in the global frame. Expectation-Maximization (EM) is a well-established method to learn such models.

Once learned, the TP-GMM can be used during execution to reproduce a trajectory for the learned skill.

Hidden semi-Markov Models (HSMMs) extend standard hidden Markov Models (HMMs) by embedding temporal information of the underlying stochastic process. That is, while in HMM the underlying hidden process is assumed to be Markov, i.e., the probability of transitioning to the next state depends only on the current state, in HSMM the state process is assumed semi-Markov. This means that a transition to the next state depends on the current state as well as on the elapsed time since the state was entered. They can be applied, in combination with TP-GMMs, for robot skill encoding to learn spatio-temporal features of the demonstrations, resulting in a task-parameterized HSMM (TP-HSMM) model. A task-parameterized HSMM (TP-HSMM) model is defined as:

$$\Theta=\{\{a_{hk}\}_{h=1}^K,(\mu_k^D,\sigma_k^D),\pi_k,\{(\mu_k^{(p)},\Sigma_k^{(p)})\}_{p=1}^P\}_{k=1}^K \qquad (1)$$

where $a_{hk}$ is the transition probability from state h to k; $(\mu_k^D, \sigma_k^D)$ describe the Gaussian distributions for the duration of state k, i.e., the probability of staying in state k for a certain number of consecutive steps; $\{\pi_k, \{\mu_k^{(p)}, \Sigma_k^{(p)}\}_{p=1}^P\}_{k=1}^K$ equal the TP-GMM introduced earlier, representing the observation probability corresponding to state k. Note that herein the number of states corresponds to the number of Gaussian components in the "attached" TP-GMM.

Consider now a multi-DoF (degree of freedom) robotic arm 101 within a static and known workspace, of which the end-effector 104 has state r such as its 6-D pose and gripper state. Also, there are multiple objects of interest 113 denoted by $O=\{o_1, \ldots, o_J\}$ such as its 6-D pose.

It is assumed that there is a set of primitive skills that enable the robot to manipulate these objects, denoted by $A=\{a_1, a_2, \ldots, a_H\}$. For each skill, a human user performs several kinaesthetic demonstrations on the robot. Particularly, for skill $a \in A$ the set of objects involved is given by $O_a \subseteq O$ and the set of demonstrations is given by $D_a=\{D_1, \ldots, D_{M_a}\}$, where each demonstration $D_m$ is a timed sequence of states consists of the end-effector state r and object states $\{p_o, o \in O_a\}$, i.e.

$$D_m=[s_t]_{t=1}^{T_m}=[(r_t\{p_{t,o}, o \in O_a\})]_{t=1}^{T_m}.$$

Thus, for each (primitive) skill $a \in A$, a TP-HSMM $\Theta_a$ (i.e. a control model) is learned as in equation (1).

Via a combination of these skills, the objects 113 can be manipulated by the robot arm 101 to reach different states. It is desirable that the robot 100 (specifically controller 106) is trained for a generic manipulation task, i.e. should be able to perform may different instances of a generic task. Each task instance is specified by an initial state $s_0$ and a set of (at least one) desired goal states $s_G$. A task (instance) is solved when the system state (also referred to as configuration) is changed from $s_0$ to $s_G$.

So, given a new task ($s_0$; $s_G$), the controller 106 should determine (i) the discrete sequence of (primitive) skills and (ii) the continuous robot trajectory to execute each skill. Here, a task may be an instance of a complex manipulation task where the sequence of desired skills and the associated trajectories depend significantly on the scenario of the task instance.

Figure 2:
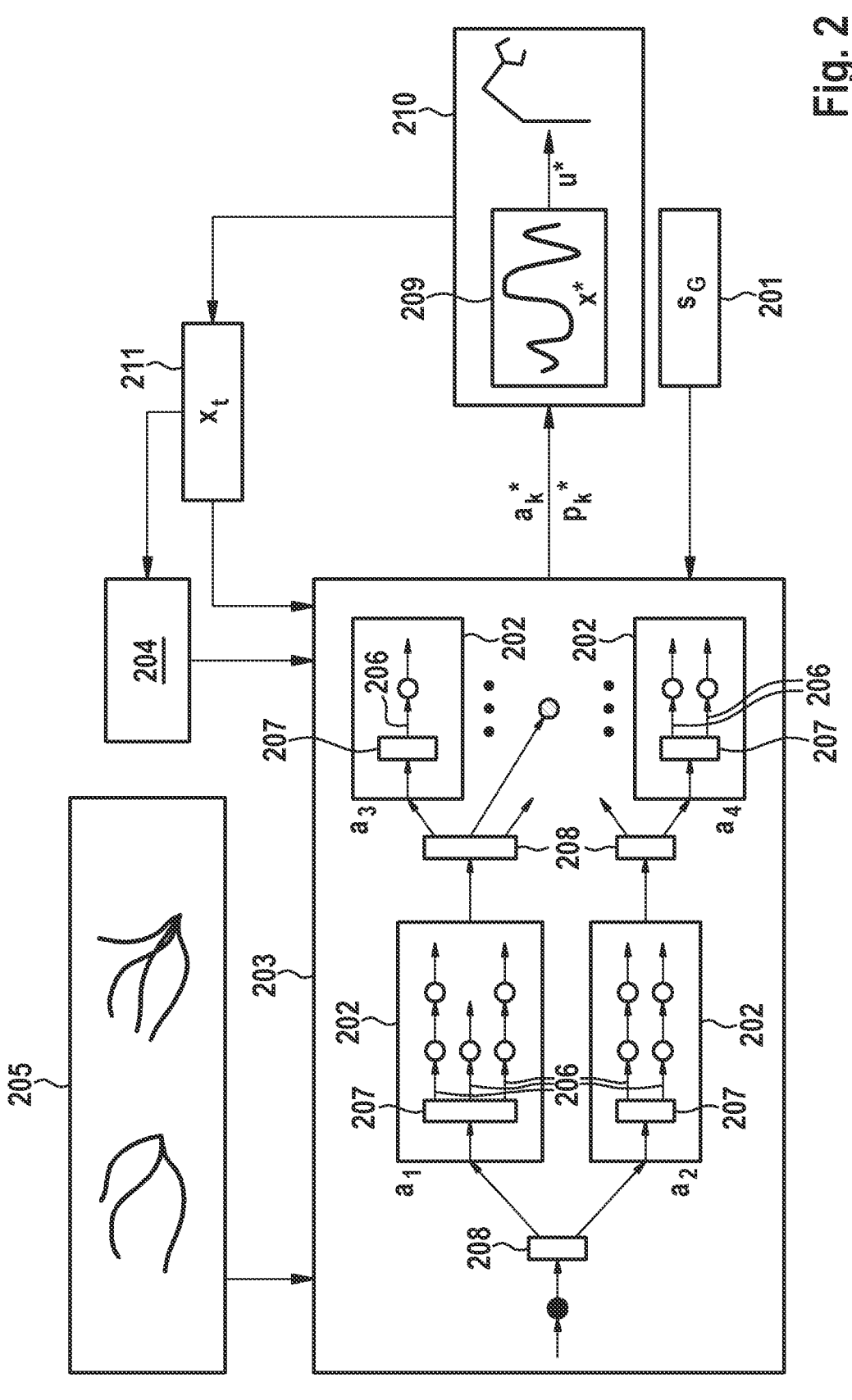
FIG. 2 illustrates robot control for a task goal according to an example embodiment of the present invention.

FIG. 2 illustrates robot control for a task goal 201 according to an embodiment.

According to various embodiments, the controller implements (extended) primitive skill models 202 and a GTN (geometric task network) which are trained interactively during online execution by human inputs.

Primitive Skill Learning

As illustrated for the skills in the skill models 202, there are often multiple ways of executing the same skill under different scenarios (called branches). For instance, there are five different ways of picking objects from a bin, i.e., approaching with different angles depending on the distances to each boundary. To handle the branching, the controller implements, for each (primitive) skill, a branch selector 207 as an extension to the TP-HSMM model $\Theta_a$ for the skill.

The controller 106 trains the branch selector 207 from demonstrations 205 and online instructions 204 to choose, for each skill 202 to be performed for achieving the task goal 201, a branch 206. A branch 206 is, in other words, a variant of the skill. For example, the skill may be to pick an object from a bin and branches may be to pick the object from the left from the right, depending on where the object is located in the bin. For example, if it is positioned near a bin wall with it right side, the branch selector 207 selects the branch to pick the object from the left.

Consider a skill primitive a with M demonstrations (from demonstrations 205 provided for all skills) and B different branches. Each execution trajectory or demonstration of the skill is denoted by $J_m=[s_t]_{t=1}^{T_m}$ which is associated with exactly one branch $b_m \in B_a=\{1, \ldots, B\}$. Let $J_a$ denote the set of such trajectories, initialized to be the set of demonstrations $D_a$ (and supplemented during operation by online instructions 204). The frames associated with $J_m$ are computed from the initial state s0, by abstracting the coordinates of the robot arm 101 and the objects 113, denoted by ($F_0$, $F_1, \ldots, F_p$), where $F_p=(b^p, A^p)$ is the coordinate of frame of frame $p \in \{1, \ldots, P\}$; their order can be freely chosen but fixed afterwards. Then, the controller 106 derives a feature vector $$v_m=(F_{01}, F_{12}, \ldots, F_{(P-1)P}) \qquad (2)$$

where $F_{ij}=(b_{ij}, a_{ij}) \in R^6$ is the relative transformation from frame $F_i$ to frame $F_j$, $b_{ij} \in R^3$ is the relative pose and $a_{ij} \in S^3$ is the relative orientation. Thus, given $J_a$, the controller 106 can construct the training data for the branch selector 207:

$$\tau_a^B=\{(v_m, b_m), \forall J_m \in J_a\},$$

where $b_m$ is the branch label of trajectory $J_m$; $v_m$ is the associated feature vector. The controller 106 can then train the branch selector 207, denoted by $C_a^B$, via any multi-nominal classification algorithm. For example, logistic regression under the "one-vs-rest" strategy yields an effective selector from few training samples. Given a new scenario with state $s_t$, the controller 106 chooses branch b with the probability:

$$\rho_b=C_a^B(s_t, b), \forall b \in B_a,$$

where $\rho_b \in [0, 1]$. Since most skills contain two or three frames, the feature vector $v_m$ normally has dimension 6 or 12.

Task Network Construction

As mentioned above, complex manipulation tasks often contain various sequences of skills 202 to account for different scenarios. For example, if a bar-code to be scanned is at the top of an object, the robot 100 needs to turn the object (i.e. execute a turn skill) before picking up the object and showing it to a camera (i.e. executing a show skill). This may not be required if the bar-code is already at the bottom. A high-level abstraction of such relations between skills is referred as task network. A valid plan evolves by transition from one skill 202 to another until the task is solved. The conditions on these transitions are particularly difficult and tedious to specify manually. Therefore, according to various embodiments, the controller 106 uses a coordination structure referred to as geometric task network (GTNs) 203, where the conditions are learned from task executions.

The a GTN 203 has a structure defined by a triple G=(V, E, f). The set of nodes V is a subset of the primitive skills A; the set of edges E⊆V×V contains the allowed transitions from one skill to another; the function $f$:v→C maps each node to a edge selector w.r.t. all of its outgoing edges. Intuitively, (V, E) specifies how skills can be executed consecutively for the given task, while function $f$(v) models the different geometric constraints among the objects and the robot, for the outgoing edges of node v. It should be noted that $f(\cdot)$ is explicitly conditioned on both the current system state and the goal state. A complete plan of a task is given by the following sequence:

$$\xi = \underline{a}s_0 a_0 s_1 a_1 s_2 \ldots s_G \overline{a},$$

where $\underline{a}$ and $\overline{a}$ are virtual "start" and "stop" skills, respectively. For different initial and goal states instances of the task the resulting plans can be different. Let $\Xi = \{\xi\}$ denote the set of complete plans for a set of given task instances. Then, for each "action-state-action" triple $(a_n, s_{n+1}, a_{n+1})$ within $\xi$, first, the pair $(a_n, a_{n+1})$ is added to an edge set $\hat{E}$ if not already present; second, for each unique skill transition $(a_n, a_{n+1})$, a set of augmented states is collected, denoted by $\hat{s}_{a_n a_{n+1}} = \{\hat{s}\}$, where $\hat{s} = (s_{n+1}, s_G)$. The controller 106 trains an edge selector 208 to select edges and thus, skills 202 to be performed. For this, for each augmented state $\hat{s}_j = (s_j, s_G) \in \hat{s}_{a_n a_{n+1}}$, the controller 106 derives the following feature vector:

$$h_j = (h_{tG}, v_G), \tag{3}$$

where $h_{tG} = (H_r, H_{o_1}, \ldots, H_{o_H})$, where $H_o = (b_o, \alpha_o) \in R^6$ is the relative translation and rotation of robot r and objects $o_1$, $o_2, \ldots, o_H \in O_{a_n}$, from the current system state $s_t$ to the goal state $s_G$; $v_G$ is the feature vector defined in equation (2) associated with the goal state $s_G$. It should be noted that $h_j$ encapsulates features from both the relative transformation to the goal, and the goal state itself. Its dimension is linear to the number of objects relevant to skill $a_n$, as shown in FIG. 3.

Figure 3:
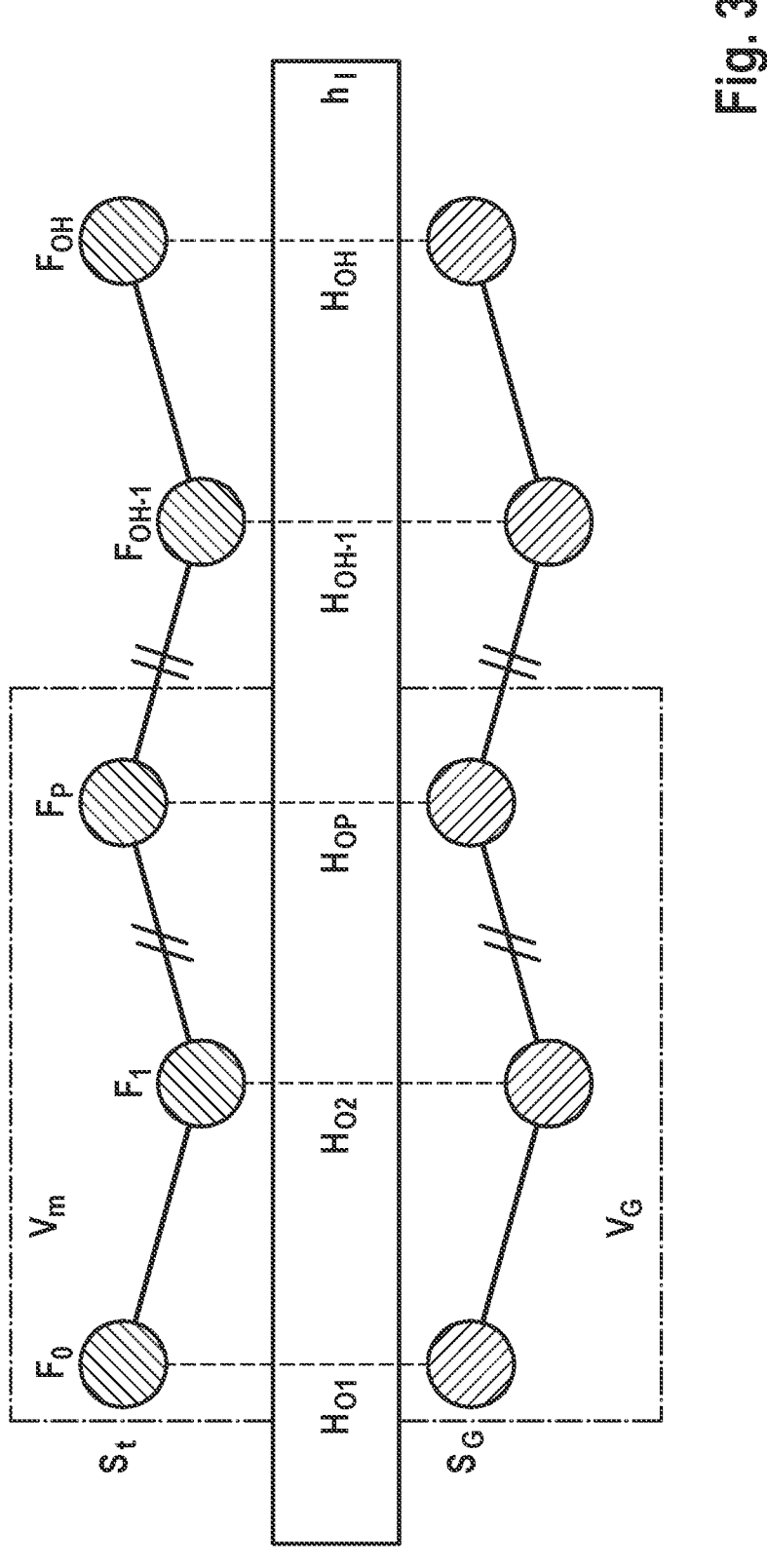
FIG. 3 illustrates the determination of feature vectors for an edge selector and a branch selector, according to an example embodiment of the present invention.

FIG. 3 illustrates the determination of feature vectors $v_m$ for the edge selector 208 and $h_j$ for the branch selector 207, given skill frames $F_p$.

Once the controller 106 has processed all plans within $\Xi$, it can construct the GTN 203 G as follows. First, its nodes and edges are directly derived from $\hat{E}$. Then, for each node a, the set of its outgoing edges in $\hat{E}$ is given by $\hat{E}_a = \{(a, a_j) \in \hat{E}\}$. Thus the function $f(a)$ returns the edge selector 208 $C_a^E$ over $\hat{E}_a$. To compute this selector, we first construct the following training data:

$$\tau_a^E = \{(h_j, e), \forall \hat{s}_j \in \hat{s}_e, \forall e \in \hat{E}_a\},$$

where e is the label for an edge e=(a, $a_j$)∈ $\hat{E}_a$; $h_j$ is the feature vector derived from equation (3). Then the edge selector $C_a^E$ can be learned via a multi-nominal classification algorithms. Similar to the branch selector 207, given a new scenario with state $s_t$ and the specified goal state $s_G$, the controller 106 then chooses an edge e with a probability of $$\rho_e = C_a^E((s_t, s_G), e), \forall e \in \hat{E}_a,$$

where $\rho_e \in [0, 1]$. It should be noted that $\rho_e$ is trivial for skills with only one outgoing edge (i.e. with only one possibility for the subsequent skill).

In the previous two sections, the approaches to learn an extended skill model (involving a branch selector 207) and the task network 203 (involving edge selectors 208) were described. The required training data are execution trajectories of the skills and complete plans of the task. According to various embodiments, the controller 106 generates training data for the branch selectors 207 and the edge selectors 208 from human instructions 204 provided during run time. This allows improving both the skill model and the task network on-the-fly.

The GTN G is initialized as empty (i.e. is initially untrained). Consider a problem instance of the task, namely $(s_0, s_G)$. The system starts from state $s_n$ whereas the GIN 203 starts from the virtual start node $a_n = \underline{a}$ for n=0. Then the associated edge selector $C_{a_n}^E$ is used to compute the probability $\rho_e$ of each outgoing edge e∈$\hat{E}_{a_n}$. Then, the next skill to execute is chosen as:

$$a_{n+1}^* = \underset{e \in \hat{E}_{a_n}}{\mathrm{argmax}} \{\rho_e(s_n, s_G) \text{ where } \rho_e > \underline{\rho}^E\},$$

where $\underline{\rho}^E > 0$ is a design parameter as the lower confidence bound. It should be noted that if the current set of outgoing edges is empty, i.e., $\hat{E}_{a_n} = \emptyset$, or the maximal probability of all edges is less than $\underline{\rho}^E$, the controller 106 asks the human operator to input the preferred next skill $a_{n+1}^*$ (as online instruction 204), e.g. by pausing execution, i.e. the robot 100 waits until the human operator inputs the online instruction, e.g. guides the robot arm 101 or inputs a branch number. Consequently, the controller 106 adds an additional data point to the training data $\tau_{a_n}^E$, i.e., $$\tau_{a_n}^E \leftarrow (h(s_n, s_G), (a_n, a_{n+1}^*)), \tag{4}$$

where the feature vector h is computed according to (3). Thus, a new edge $(a_n, a_{n+1}^*)$ is added to the graph topology (V, E) if not present, and the embedded function $f(\cdot)$ is updated by re-learning the edge selectors $C_{a_n}^E$ given this new data point.

With regarding execution and update the branch selectors 207, let $a_{n+1}$ be chosen as the next skill (according to the edge selector 208). Then the controller 106 uses the branch selector $C_{a_{n+1}}^B$ to predict the probability of each branch $\rho_b$, $\forall b \in B_{a_{n+1}}$. Then it chooses the most likely branch for $a_{n+1}$ by $$b_{n+1}^* = \underset{b \in B_{a_{n+1}}}{\mathrm{argmax}} \{\rho_b(s_n), \text{ where } \rho_b > \underline{\rho}^B\},$$

where $\underline{\rho}^B > 0$ is another parameter as the lower confidence bound for the branch selection. Again, as for the edge selection, if the controller 106 cannot find a branch in this manner, it asks the human operator to input the preferred branch $b_{n+1}^*$ for skill $a_{n+1}$, e.g. by guiding the robot arm 101 or inputting an edge number. In that case, the controller 106 adds an additional data point to the training data $\tau_{a_{n+1}}^B$, i.e., $$\tau_{a_{n+1}}^B \leftarrow (v(s_n), b_{n+1}^*), \tag{5}$$

where the feature vector v is computed according to equation (2).

Once the controller 106 has selected a branch $b^\star$ for the desired next skill $a_{n+1}{}^\star$, the controller 106 can retrieve its trajectory using the skill model $\theta_{a_{n+1}}$. The retrieval process consists of two steps: First, the most-likely sequence of GMM components within the desired branch (denoted by $k_T{}^\star$) can be computed via a modified Viterbi algorithm. Then, a reference trajectory 209 generated by an optimal controller 210 (e.g. LOG controller) to track this sequence of Gaussians in the task space. Thus this reference trajectory 209 is then sent to the low-level impedance controller to compute the control signal $u^\star$.

Afterwards, the system state is changed to $s_{n+2}$ with different poses of the robot arm 113 and the objects 113, i.e., obtained from the state estimation and perception modules (such as a camera) providing observations 211. Given this new state, the controller 106 repeats the process to choose the next skill and its optimal branch, until the goal state 201 is reached.

In the following, an exemplary overall algorithm is given in pseudo code (using the usual English keywords like "while", "do", etc.).

```
    Input: {D_a, ∀a ∈ A}, human inputs {a_n*, b_n*}.
    Output: 𝒢, {𝒞_a^B}, u*.
    /* offline learning                    */
1   Learn θ_a and {𝒞_a^B}, ∀a ∈ A.
2   Initialize or load existing 𝒢.
    /* online execution and learning       */
3   while new task (s_0, s_G) given do
4   |    Set a_n ← a and s_n ← s_0.
5   |    while s_n ≠ s_G do
6   |    |    𝒢, a_{n+1} = ExUpGtn(𝒢, a_n, (s_n, s_G), a_{n+1}*).
7   |    |    𝒞_{a_{n+1}}^B, b_{n+1} = ExUpBrs(𝒞_{a_{n+1}}^B, s_n, b_{n+1}*).
8   |    |    Compute u* for branch b_{n+1} of skill a_{n+1}.
9   |    |_   Obtain new state s_{n+1}. Set n ← n + 1.
    |_
```

During the online execution for solving new tasks, the algorithm executes and updates the GTN 203 as described above. This is done by the function ExUpGtn(·) in Line 6, with possible human input $a_n{}^\star$ if required. Once the next skill $a_{n+1}$ is chosen, the algorithm executes and updates the branch selector 208, This is done by the function ExUpBrs(·) in Line 7, with possible human input $b_{n+1}{}^\star$ if required. Consequently the GIN 203 and branch selectors 208 are updated and improved according to equation (4) and equation (5) on-the-fly. Compared with the manual specification of the transition and branching conditions, the human inputs are more intuitive and easier to specify.

Figure 4:
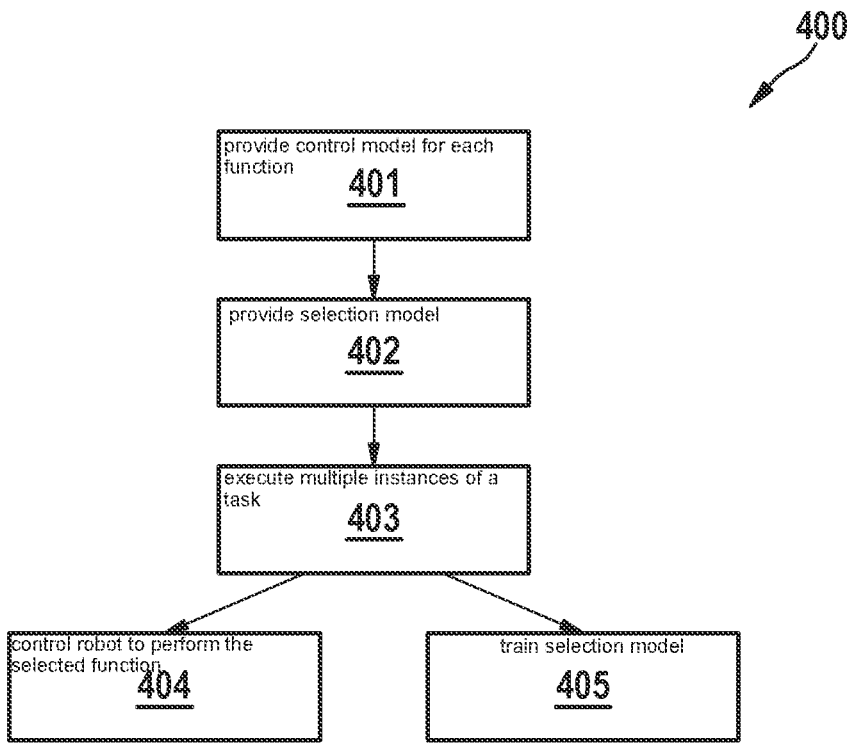
FIG. 4 shows a flow diagram illustrating a method for controlling a robot device, according to an example embodiment of the present invention.

In summary, according to various embodiments, a method is provided as illustrated in FIG. 4.

FIG. 4 shows a flow diagram 400 illustrating a method for controlling a robot device.

In 401, for each function of a plurality of functions, a control model (skill model or skill branch model) for controlling the robot device to perform the function is provided.

In 402, a selection model for selecting among the plurality of functions is provided.

In 403, multiple instances of a task are executed by the robot device (i.e. the robot device is controlled to perform multiple instances of a task), comprising, in each execution, when a function of the plurality of functions needs to be selected to perform the task instance, checking whether the selection model provides a selection of a function and, if the selection model provides a selection of a function, controlling the robot device to perform the function selected by the selection model using the control model for the selected function in 404 and, if the selection model does not provide a selection of a function, receiving user input indicating a selection of a function, selecting a function according to the selection indicated by the user input, controlling the robot device to perform the function selected according to the selection indicated by the user input using the control model for the selected function and training the selection model according to the selection indicated by the user input in 405.

The approach of FIG. 4 can be used to compute a control signal for controlling a physical system generally referred to as "robot device", like e.g. a computer-controlled machine, like a robot, a vehicle, a domestic appliance, a power tool, a manufacturing machine, a personal assistant or an access control system. According to various embodiments, a policy for controlling the physical system may be learnt and then the physical system may be operated accordingly.

Various embodiments may receive and use image data (i.e. digital images) from various visual sensors (cameras) such as video, radar, LiDAR, ultrasonic, thermal imaging, motion, sonar etc., for example as a basis for the descriptor images.

According to one embodiment, the method is computer-implemented.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for controlling a robot device, comprising the following steps:

providing, for each function of a plurality of functions, a control model for controlling the robot device to perform the function;

providing a selection model for selecting among the plurality of functions;

executing multiple instances of a task by the robot device, including, in each execution, when a function of the plurality of functions needs to be selected to perform the task instance, checking whether the selection model provides a selection of a function and, based on the selection model providing a selection of a function, controlling the robot device to perform the function selected by the selection model, using the control model for the selected function; and based on the selection model not providing a selection of a function, receiving user input indicating a selection of a function, selecting a function according to the selection indicated by the user input, controlling the robot device to perform the function selected according to the selection indicated by the user input using the control model for the selected function, and training the selection model according to the selection indicated by the user input, the training being performed during executing the multiple instances of the task, wherein:

the selection model includes at least one branch selector involving a skill model and at least one edge selector involving a task network, the edge selector selects among skills in the task network, the branch selector selects among branches of skills, and training data is generated for the at least one branch selector and the at least one edge selector from the user input such that the skill model and the task network are trained in real time during executing the multiple instances of the task.

2. The method of claim 1, wherein the selection model outputs indications of confidences for selections of functions of the plurality of functions and wherein training the selection model according to the selection indicated by the user input includes adjusting the selection model to increase a confidence output by the selection model to select the function selected according to the selection indicated by the user input.

3. The method of claim 1, wherein the selection model outputs indications of confidences for selections of functions of the plurality of functions, and the checking of whether the selection model provides a selection of a function includes checking whether the selection model outputs an indication of a confidence for a selection of the function which is above a predetermined lower confidence bound.

4. The method of claim 1, wherein the functions include skill and branches of skills and the selection model is trained to provide, for sets of alternative skills, a selection of a skill, and, for sets of alternative branches of skills, a selection of a branch.

5. The method of claim 1, wherein the providing of the control model for each function includes performing demonstrations of the function and training the control model using the demonstrations.

6. The method of claim 1, wherein the selection model is a logistic regression model.

7. The method of claim 1, further comprising: based on the selection model not providing a selection of a function, pausing operation of the robot device until user input indicating a selection of a function has been received.

8. A robot controller configured to control a robot device, the robot controller configured to:

provide, for each function of a plurality of functions, a control model for controlling the robot device to perform the function;

provide a selection model for selecting among the plurality of functions;

execute multiple instances of a task by the robot device, including, in each execution, when a function of the plurality of functions needs to be selected to perform the task instance, checking whether the selection model provides a selection of a function and, if the selection model provides a selection of a function, control the robot device to perform the function selected by the selection model, using the control model for the selected function; and if the selection model does not provide a selection of a function, receive user input indicating a selection of a function, select a function according to the selection indicated by the user input, control the robot device to perform the function selected according to the selection indicated by the user input using the control model for the selected function, and train the selection model according to the selection indicated by the user input, the selection model is trained during executing the multiple instances of the task, wherein:

the selection model includes at least one branch selector involving a skill model and at least one edge selector involving a task network, the edge selector selects among skills in the task network, the branch selector selects among branches of skills, and training data is generated for the at least one branch selector and the at least one edge selector from the user input such that the skill model and the task network are trained in real time during executing the multiple instances of the task.

9. A non-transitory computer-readable medium on which are stored instructions controlling a robot device, the instructions, when executed by a computer, causing the computer to perform the following steps:

providing, for each function of a plurality of functions, a control model for controlling the robot device to perform the function;

providing a selection model for selecting among the plurality of functions;

executing multiple instances of a task by the robot device, including, in each execution, when a function of the plurality of functions needs to be selected to perform the task instance, checking whether the selection model provides a selection of a function;

if the selection model provides a selection of a function, controlling the robot device to perform the function selected by the selection model, using the control model for the selected function; and if the selection model does not not provide a selection of a function, receiving user input indicating a selection of a function, selecting a function according to the selection indicated by the user input, controlling the robot device to perform the function selected according to the selection indicated by the user input using the control model for the selected function, and training the selection model according to the selection indicated by the user input, the training being performed during executing the multiple instances of the task, wherein:

the selection model includes at least one branch selector involving a skill model and at least one edge selector involving a task network, the edge selector selects among skills in the task network, the branch selector selects among branches of skills, and training data is generated for the at least one branch selector and the at least one edge selector from the user input such that the skill model and the task network are trained in real time during executing the multiple instances of the task.

\* \* \* \* \*